US009996612B2

(12) United States Patent
Candelore et al.

(10) Patent No.: US 9,996,612 B2
(45) Date of Patent: Jun. 12, 2018

(54) SYSTEM AND METHOD FOR AUDIO IDENTIFICATION AND METADATA RETRIEVAL

(75) Inventors: Brant Candelore, Escondido, CA (US); Robert Hardacker, Escondido, CA (US); Christopher Jensen Read, San Diego, CA (US)

(73) Assignee: Sony Corporation, Tokyo (JP)

( * ) Notice: Subject to any disclaimer, the term of this patent is extended or adjusted under 35 U.S.C. 154(b) by 1709 days.

(21) Appl. No.: 11/835,954

(22) Filed: Aug. 8, 2007

(65) Prior Publication Data

US 2009/0041418 A1   Feb. 12, 2009

(51) Int. Cl.
  *H04N 5/76*  (2006.01)
  *H04N 7/16*  (2011.01)
  (Continued)

(52) U.S. Cl.
  CPC .. *G06F 17/30758* (2013.01); *G06F 17/30743* (2013.01); *H04N 7/17318* (2013.01);
  (Continued)

(58) Field of Classification Search
  CPC ............... H04N 21/233; H04N 21/434; H04N 21/43989; H04N 21/235; H04N 21/4331; H04N 21/4622; H04N 1/00005; G06F 17/30743; G10L 25/00; H04B 1/18
  USPC ......... 386/341, E9.016; 348/E5.103, E7.071, 348/E5.105, E7.061; 379/88.14; 434/236, 323; 700/15.045, 94, 500; 704/200, 200.1, 270, 275; 707/722, 899, 707/999.003, 999.102, 999.1; 709/229,
  (Continued)

(56) References Cited

U.S. PATENT DOCUMENTS 6,192,340 B1 *  2/2001  Abecassis ............ G10H 1/0058
                                                       455/185.1
6,311,189 B1   10/2001  de Vries et al.
                (Continued)

FOREIGN PATENT DOCUMENTS

JP        2000259164 A  *  3/1999  ............. G10L 13/06

OTHER PUBLICATIONS

Kurth, Frank. et al., A Prototypical Service for Real-Time Access to Local Context-Based Music Information, University of Bonn, Germany, Department of Computer Science III, 2004.
(Continued)

*Primary Examiner* — Thai Tran
*Assistant Examiner* — Syed Hasan
(74) *Attorney, Agent, or Firm* — John L. Rogitz

(57) ABSTRACT

Herein, a display device, system and method are described for identifying digital content through comparison of one or more audio thumbnails when the digital content is provided without metadata. According to one embodiment, a display device comprises a display, audio conversion logic and a transceiver. The audio conversion logic is adapted to produce one or more audio thumbnails, which are compact representations of a snippet of audio from that incoming digital content without the metadata. The transceiver is adapted to transmit the one or more audio thumbnails in order to (i) retrieve metadata associated with the digital content from an external source separate from a source of the digital content and (ii) display information provided by the metadata on the display.

13 Claims, 4 Drawing Sheets

(51) Int. Cl.

| | | |
|---|---|---|
| *H04N 7/173* | (2011.01) | |
| *H04L 9/32* | (2006.01) | |
| *G06F 3/048* | (2013.01) | |
| *G06F 15/00* | (2006.01) | |
| *G06F 17/00* | (2006.01) | |
| *G06F 17/30* | (2006.01) | |
| *H04N 21/231* | (2011.01) | |
| *H04N 21/233* | (2011.01) | |
| *H04N 21/439* | (2011.01) | |
| *H04N 21/4722* | (2011.01) | |
| *H04N 21/658* | (2011.01) | |
| *H04N 21/81* | (2011.01) | |
| *H04N 21/84* | (2011.01) | |
| *H04N 21/845* | (2011.01) | |
| *H04N 5/44* | (2011.01) | |
| *H04N 9/804* | (2006.01) | |

(52) U.S. Cl.
CPC ..... *H04N 21/233* (2013.01); *H04N 21/23106* (2013.01); *H04N 21/4394* (2013.01); *H04N 21/4398* (2013.01); *H04N 21/4722* (2013.01); *H04N 21/6582* (2013.01); *H04N 21/8106* (2013.01); *H04N 21/8133* (2013.01); *H04N 21/84* (2013.01); *H04N 21/8456* (2013.01); *H04N 5/4401* (2013.01); *H04N 9/8042* (2013.01)

(58) Field of Classification Search
USPC .......... 709/231, 235; 713/176; 715/764; 725/62, 100, 131, 151, 86, 91, 110, 105, 725/115, 39, 40, 41, 52, 53, 31, 46, 109, 725/136; 455/185.1
See application file for complete search history.

(56) References Cited

U.S. PATENT DOCUMENTS

| | | | |
|---|---|---|---|
| 6,956,593 B1 | 10/2005 | Gupta et al. | |
| 7,013,301 B2 | 3/2006 | Holm et al. | |
| 7,660,808 B2* | 2/2010 | Brechner | G06F 17/30017 707/999.102 |
| 7,870,125 B1* | 1/2011 | Istvan | H04N 21/2355 707/722 |
| 7,890,973 B2* | 2/2011 | Urabe | G06F 3/0481 725/39 |
| 7,962,948 B1* | 6/2011 | Girouard et al. | 725/115 |
| 2001/0005828 A1* | 6/2001 | Yamaji | G11B 20/00086 704/500 |
| 2002/0040295 A1* | 4/2002 | Saunders | H04S 3/00 704/200 |
| 2003/0135513 A1* | 7/2003 | Quinn | G06F 17/30743 |
| 2004/0109674 A1 | 6/2004 | Ohmori | |
| 2004/0260682 A1* | 12/2004 | Herley | G06K 9/00496 |
| 2005/0076363 A1* | 4/2005 | Dukes | G06Q 30/02 725/46 |
| 2005/0097606 A1* | 5/2005 | Scott et al. | 725/52 |
| 2005/0278739 A1* | 12/2005 | Yaksick et al. | 725/41 |
| 2006/0020962 A1* | 1/2006 | Stark | G06F 17/30861 725/32 |
| 2006/0101269 A1* | 5/2006 | Moskowitz | G06F 21/10 713/176 |
| 2006/0182236 A1* | 8/2006 | Kapoor | H04M 1/72552 379/88.14 |
| 2006/0234199 A1* | 10/2006 | Walker | G09B 7/00 434/323 |
| 2006/0288374 A1* | 12/2006 | Ferris | H04H 20/33 725/62 |
| 2008/0046406 A1* | 2/2008 | Seide | G06F 17/30743 |
| 2008/0249982 A1* | 10/2008 | Lakowske | 707/3 |
| 2009/0005890 A1* | 1/2009 | Zhang | G06F 17/30743 700/94 |
| 2009/0044136 A1* | 2/2009 | Flider | G11B 27/034 715/764 |

OTHER PUBLICATIONS

Allamanche, Eric. et al, Content-based Identification of Audio Material Using MPEG-7 Low Level Description, http://ismir2001.ismir.net/pdf/allamche.pdf, 2001.

* cited by examiner

SYSTEM AND METHOD FOR AUDIO IDENTIFICATION AND METADATA RETRIEVAL

BACKGROUND

1. Field

Embodiments of the invention relate to the field of entertainment services. More specifically, one embodiment of the invention relates to a system and method for identifying incoming content and downloading metadata associated with this content to a display device after such identification.

2. General Background

Over the past few years, analog-based entertainment has rapidly given way to its digital counterpart. Despite the growing demand for digital-based entertainment, the migration toward high-definition television (HDTV) television broadcasts has been quite slow. Any upcoming entertainment-based technology, such as interactive television for example, will likely experience the same fate for a number of reasons.

One reason is that, as set-box boxes continue to handle more of the data/signal processing, televisions are being relegated to the role of "dumb" monitors. Therefore, despite heightened interests by television manufacturers in providing interactive television capabilities to consumers, it is extremely difficult to make such technology available without assistance from the set-top box manufacturers.

For instance, in some cable systems, televisions receive television programming without any metadata. The metadata provides information pertaining to the data stream such as the title of the television program for example. Metadata is necessary in order to provide a better overall experience for any interactive television, but in certain cases, is not being supplied to the television by the set-top boxes. Hence, without a supply of metadata from the set-top box, a television or other display device would need to be able to recover the metadata based on the content itself in order to provide an effective interactive television platform.

BRIEF DESCRIPTION OF THE DRAWINGS

Embodiments of the invention are illustrated by way of example and not by way of limitation in the accompanying drawings, in which like references indicate similar elements and in which.

DETAILED DESCRIPTION

Various embodiments of the invention relate to a system and method for identifying content and uploading metadata associated with the content after identification. In general, one method is directed to the use of audio information to identify a location within an audio-video (A/V) program that is being viewed so as to enable usage and insertion of time pertinent metadata.

For instance, according to one embodiment of the invention, a system and/or method may be deployed for identifying digital content through comparison of one or more audio thumbnails with pre-stored audio thumbnails loaded within a database.

Upon comparison of the audio thumbnail(s) with pre-stored audio thumbnails stored in the database, metadata for the digital content featuring the audio thumbnail(s) is obtained and provided to a display device for rendering. In addition to identifying the digital content, the playback position of such content may be ascertained by computing location of the audio thumbnail within the pre-stored audio associated with the digital content.

In the following description, certain terminology is used to describe features of the invention. For instance, "digital content" may include, but is not limited or restricted to audio or a combination of both audio and video. The term "A/V program" may be broadly construed as any broadcast or unicast transmission with audio and/or video data, inclusive of audio/video transmissions such as broadcast, VOD and pay-per-view programming, IPTV streams, uploaded movies from a DVD, or the like.

The term "logic" is representative of hardware and/or software configured to perform one or more functions. Examples of "software" include a series of executable instructions in the form of an application, an applet, routine, or even one or more executable instructions. The software may be stored in any type of machine readable medium such as a programmable electronic circuit, a semiconductor memory device such as volatile memory (e.g., random access memory, etc.) and/or non-volatile memory (e.g., any type of read-only memory "ROM", flash memory), a floppy diskette, an optical disk (e.g., compact disk or digital video disc "DVD"), a hard drive disk, tape, or the like.

Figure 1:
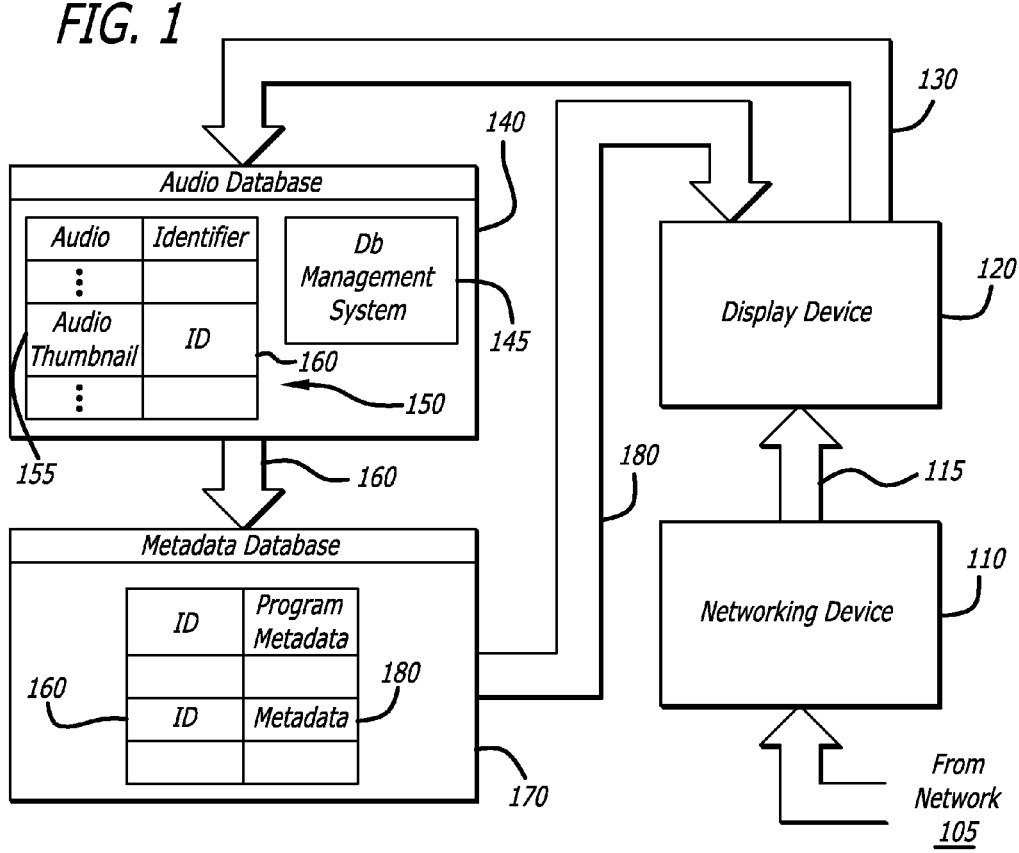
FIG. 1 an exemplary embodiment of an entertainment system featuring an embodiment of the invention.

Referring to FIG. 1, an exemplary embodiment of an entertainment system 100 is shown. Entertainment system 100 comprises a networking device 110 (e.g., set-top box, or the like) and a display device 120 (e.g., television, or the like). Networking device 110 receives digital content from a network 105 such as over-the-air broadcast TV, a cable network, a satellite communications system, a public network (e.g., Internet) supporting Internet Protocol Television (IPTV), or the like. Networking device 110 is adapted to decrypt the incoming digital content in the event that the digital content is encrypted. The networking device may contain a hard disk drive to enable Personal Video Recorder (PVR) applications. In addition, networking device 110 also is adapted to decompress the incoming digital content in the event that the incoming digital content is compressed.

Upon decrypting and/or decompressing the incoming digital content, networking device 110 routes the resultant digital content 115 to display device 120 for rendering. According to this embodiment of the invention, digital content 115 includes an audio-video (A/V) program but does not include metadata associated with the A/V program. The "metadata" is information that may be of interest to the consumer such as information concerning the A/V program (e.g., title, duration, actors, director, geographic setting for the program, synopsis, etc.), additional plot details for the A/V program, advertising, (uniform resource locator "URL") links to a network, or the like.

According to one embodiment of the invention, display device 120 is adapted to process audio associated with digital content 115. If analog content is output from the networking device 110, then such content is digitized in the display device 120. Such processing is performed in order to produce one or more audio thumbnails 130, each "audio thumbnail" being a compact representation of a snippet of audio from digital content 115. Audio thumbnails 130 are sometimes referred to as "audio fingerprints".

For instance, according to one embodiment of the invention, an audio thumbnail may be a predetermined amount of audio (e.g., one or more frames of audio data for a scene within the A/V program) that has undergone Fast Fourier Transform (FFT) processing to convert the sampled audio from the time domain to the frequency domain. Thereafter, at least some of the sampled audio after FFT processing is used for the audio thumbnail.

For simplicity, the following discussions concerning the operations for identifying the digital content based on the audio shall focus on the comparison of a single audio thumbnail since the comparison of multiple audio thumbnails would be performed in the same manner.

After being extracted, audio thumbnail 130 is routed to database 140 (hereinafter referred to as "audio database 140"). Audio database 140 features a management system 145 that compares audio thumbnail 130 to pre-stored audio thumbnails 150, which are previously processed audio for predetermined portions of the audio from the A/V program. If a match is found between audio thumbnail 130 and one of the pre-stored audio thumbnails 150 (hereinafter referred to as "matching audio thumbnail 155"), an identifier 160 corresponding to matching audio thumbnail 155 is provided to a secondary database 170 (hereinafter referred to as "metadata database 170").

Identifier 160 operates as an index to retrieve metadata 180 associated with the A/V program that is determined to feature audio represented by audio thumbnail 130. Metadata 180 is then provided to display device 120 where all or at least a portion of metadata 180 is rendered for display with the A/V program. The metadata may be used to display additional information pertaining to A/V program or links (URLs) to such information. The additional information may be directed to ancillary information pertaining to the A/V program itself or may have higher granularity as with contextually based information (e.g., information based on particulars on a scene-by-scene basis). Examples of the use of metadata for enhanced display and interactive viewing is described below.

Figure 2:
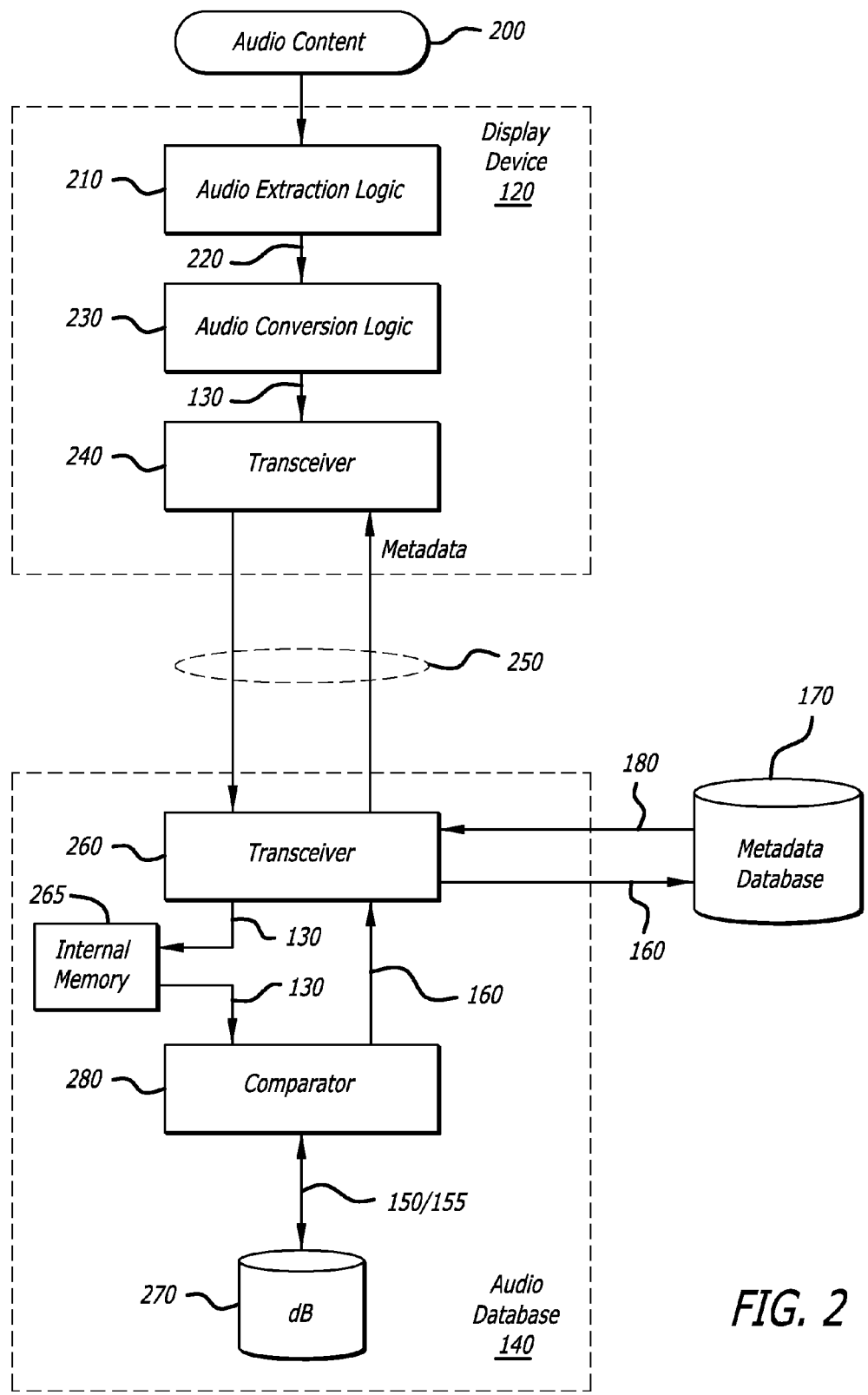
FIG. 2 is a more-detailed illustrative embodiment of communications between the display device and audio thumbnail database in accordance with one embodiment of the invention.

Referring now to FIG. 2, a more detailed illustration of the communications between display device 120 and audio thumbnail database 130 is shown. Upon receiving a stream of audio 200, display device 120 routes audio 200 to audio extraction logic 210. Audio extraction logic 210 separates a predetermined amount of audio 200 into segments referred to as "audio snippets" 220, which are output to audio conversion logic 230. The separation may be performed on a time-basis, e.g. using video frame synchronization, or may be performed using local maxima and/or minima of audio 200 as reference points.

It is contemplated that audio extraction logic 210 may optionally perform pre-processing operations on audio 200 that will later provide assistance in subsequent analysis in audio thumbnail comparisons. For instance, audio extraction logic 210 may perform normalization to provide uniformity between the samples.

Audio conversion logic 230 is adapted to perform FFT and other operations on audio snippets 220 in order to produce audio thumbnails 130 that are provided to a transceiver 240, which packetizes audio thumbnails 130 for transmission to audio database 140. For instance, transceiver 240 may create Ethernet frames where audio thumbnails 130 are placed within the payload within these frames for transmission to audio database 140 over a network 250 such as a public network (e.g., Internet) or a private network (e.g., local area network, peer-to-peer interconnect, etc.).

Audio database 140 comprises a transceiver 260 that is adapted to receive transmissions over network 250 and to extract audio thumbnails 130 for comparison with pre-stored audio thumbnails 150. Pre-stored audio thumbnails 150 are based on audio snippets of A/V programs (e.g., televised programs, released movies, etc.) that are uploaded into audio database 140 in advance. In other words, new televised A/V programs will need to be processed and uploaded into audio database 140 prior to its scheduled airing. Such uploading may be controlled performed by service or content providers, television networks, entities responsible for adding closed-captioning data to A/V programs, or any other parties assigned with such responsibilities.

More specifically, extracted audio thumbnails 130 may be temporarily stored in an internal memory 265 and successively compared with pre-stored audio thumbnails 150 stored in a database 270 by a comparator 280. Comparator 280 performs comparison operations on each audio thumbnail 130 until a matching audio segment is found or all of the audio pre-stored audio thumbnails 150 have been analyzed and compared without detecting a match.

Furthermore, in order to improve the efficiency of the searching process, an initial search may be conducted for televised programs that are knowingly scheduled to be aired at a particular time that is provided from display device 120 or known by audio database 140. Alternatively, metadata may be gathered from devices other than the set-top box such as a universal remote controller, wireless router or other peripheral devices that may have access to television guide information.

If a single match is detected between a selected audio thumbnail 130 and pre-stored audio thumbnail 155, comparator 280 will provide identifier 160 corresponding to the matching audio thumbnail to transceiver 260 for routing to metadata database 170. However, in the event that multiple matches are detected, such as when particular audio is used in a variety of A/V programs (e.g., audio from a popular song), additional comparisons are performed on other extracted audio thumbnails to further refine the search to determine, with better reliability, which A/V program is associated with audio thumbnails 130. After such detection, identifier 160 of the A/V program is provided to comparator 280 for transmission to metadata database 170.

Identifier 160 is used to as an index or is used to generate an index for locating metadata 180 associated with the A/V program featuring the audio thumbnail(s) 130. Upon location, metadata 180 is provided to transceiver 260 for subsequent re-packetization and transmission to the display device 120 for rendering.

Figure 3A:
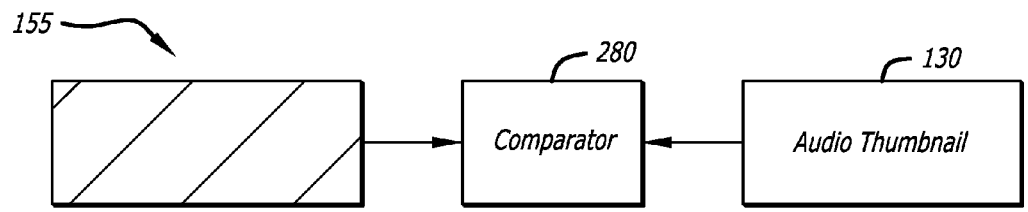
FIG. 3A is a first illustrative embodiment of the comparison between audio thumbnails and pre-stored audio thumbnails in accordance with one embodiment of the invention.

Referring now to FIG. 3A, a first illustrative embodiment of the comparison between audio thumbnails and audio segments is shown. According to this embodiment of the invention, audio thumbnail 130 is compared with the entire pre-stored audio thumbnail 155. Such comparison may involve the computation of differences between these thumbnails. For instance, the comparison may involve the computation of Euclidean distances measurements between row vectors associated with matrices computed using Singular Value Decomposition "SVD" for pre-stored audio thumbnail 155 and audio thumbnail 130 or between local maxima or minima of the audio thumbnails. Likewise, measurements may be performed by comparison of frequency spectrums of such audio, which is influenced by the background or foreground audio, loudness (e.g., volume/decibel level), pitch, and the like.

Figure 3B:
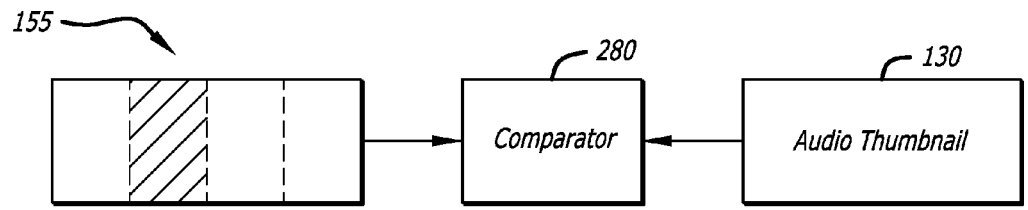
FIG. 3B is a second illustrative embodiment of the comparison between audio thumbnails and pre-stored audio thumbnails in accordance with one embodiment of the invention.

Alternatively, as shown in FIG. 3B, portions of pre-stored audio thumbnail 155 may be successively compared with audio thumbnail 130 in order to address different sampling rates, where the sampling duration of pre-stored audio thumbnail 155 is greater than audio thumbnail 130.

Figure 4:
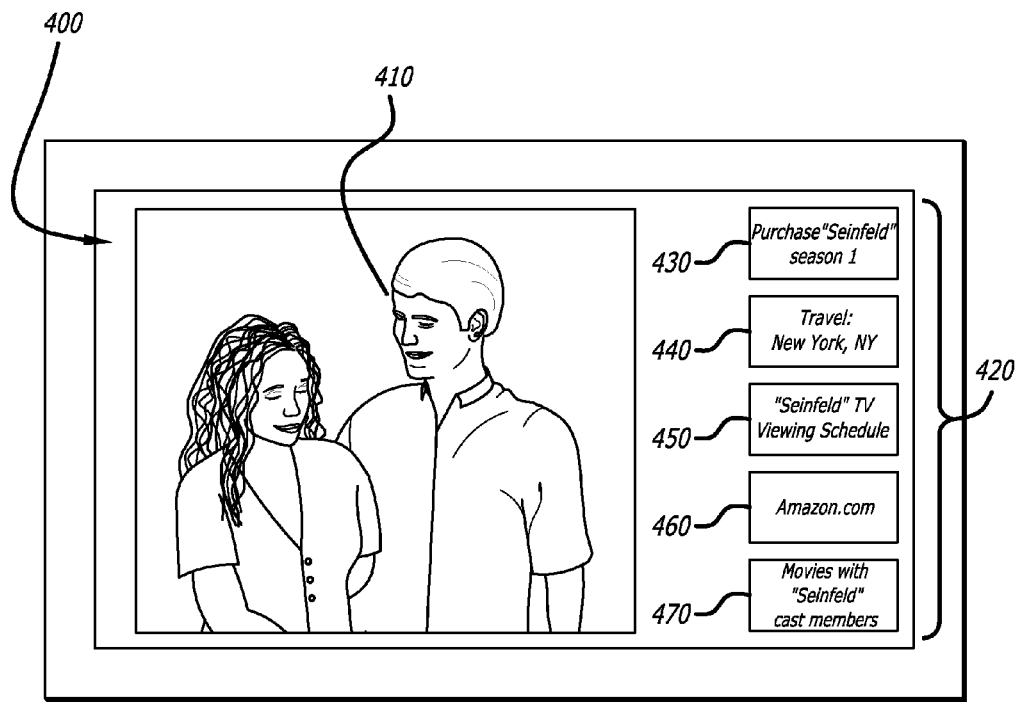
FIG. 4 is a first illustrative embodiment of a display produced by the display device based on metadata extracted from the metadata database.

Referring now to FIG. 4, an illustrative embodiment of a display 400 produced by display device 120 based on metadata extracted from metadata database 180 of FIGS. 1-2 is shown. Display 400 features a video output 410 that renders the A/V program received from a first remote source (e.g., via networking device 110 of FIG. 1). In addition, metadata received from a second remote source (e.g., metadata database 180 of FIG. 1) is used to produce selectable images 420 placed along an outer border of video output 410. However, as an alternative embodiment, images 420 may be displayed as background images, namely as sub-images under video output 410 so that these images appear in a "ghost" display format.

As shown for this embodiment of the invention, there are five (5) selectable images to provide an interactive experience for the viewer. A first image 430 is a uniform resource locator (URL) that, when selected, allows the user to purchase season one of Seinfeld®, a televised sitcom now in syndication. The consumer may register a credit and/or debit card (or link purchases to an account with credit and/or debit card authorization already established). Such registration may occur after purchase of the television for warranty protection. This would allow consumers to purchase items online while viewing the displayed A/V programs.

A second image 440 is an URL directed to travel information for New York City, N.Y., the setting for the Seinfeld® sitcom. The metadata could also be more contextually based. For example by analyzing where the playback is occurring in the content, the metadata is aware that the characters of the Seinfeld® sitcom are visiting the Metropolitan Museum of Modern Art in New York City, and a URL for the museum is displayed. The third item 450 is an URL directed to a viewing schedule for the Seinfeld® sitcom for all syndicated channels. The fourth item 460 is an URL to Amazon.com that is directed to books pertaining to interesting New York sites that should be visited by tourists. The last item 470 is an URL directed to current televised programs and movies with Seinfeld® cast members.

Figure 5:
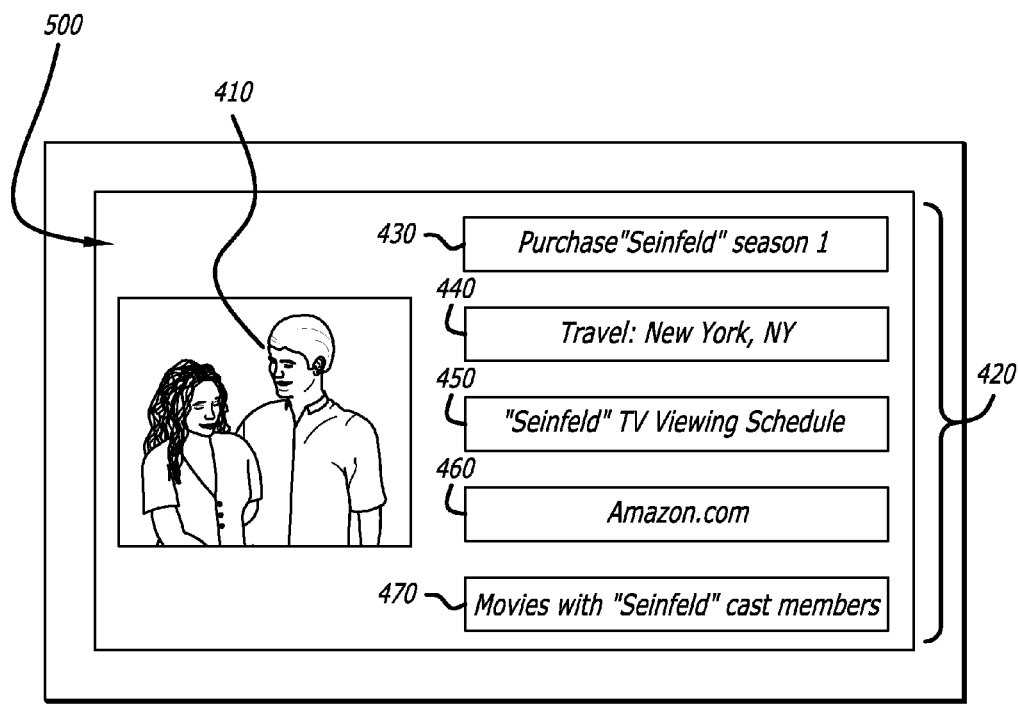
FIG. 5 is a second illustrative embodiment of a display produced by the display device based on metadata extracted from the metadata database.

Referring now to FIG. 5, a second illustrative embodiment of a display 500 produced by display device 120 based on metadata extracted from metadata database 180 is shown. Upon selection by the user via a remote control, the layout size of video output 410 is reduced in size while images 420 featuring e-commerce and advertising metadata are enlarged. This assists in navigation through selectable images by the consumer, especially when the viewer wants to surf the Internet during certain selected time, such as during commercials for example. The viewer now has the ability to monitor the displayed contents of the A/V program so that the viewer can return to watch the A/V program once the commercial or commercials have ended.

Figure 6:
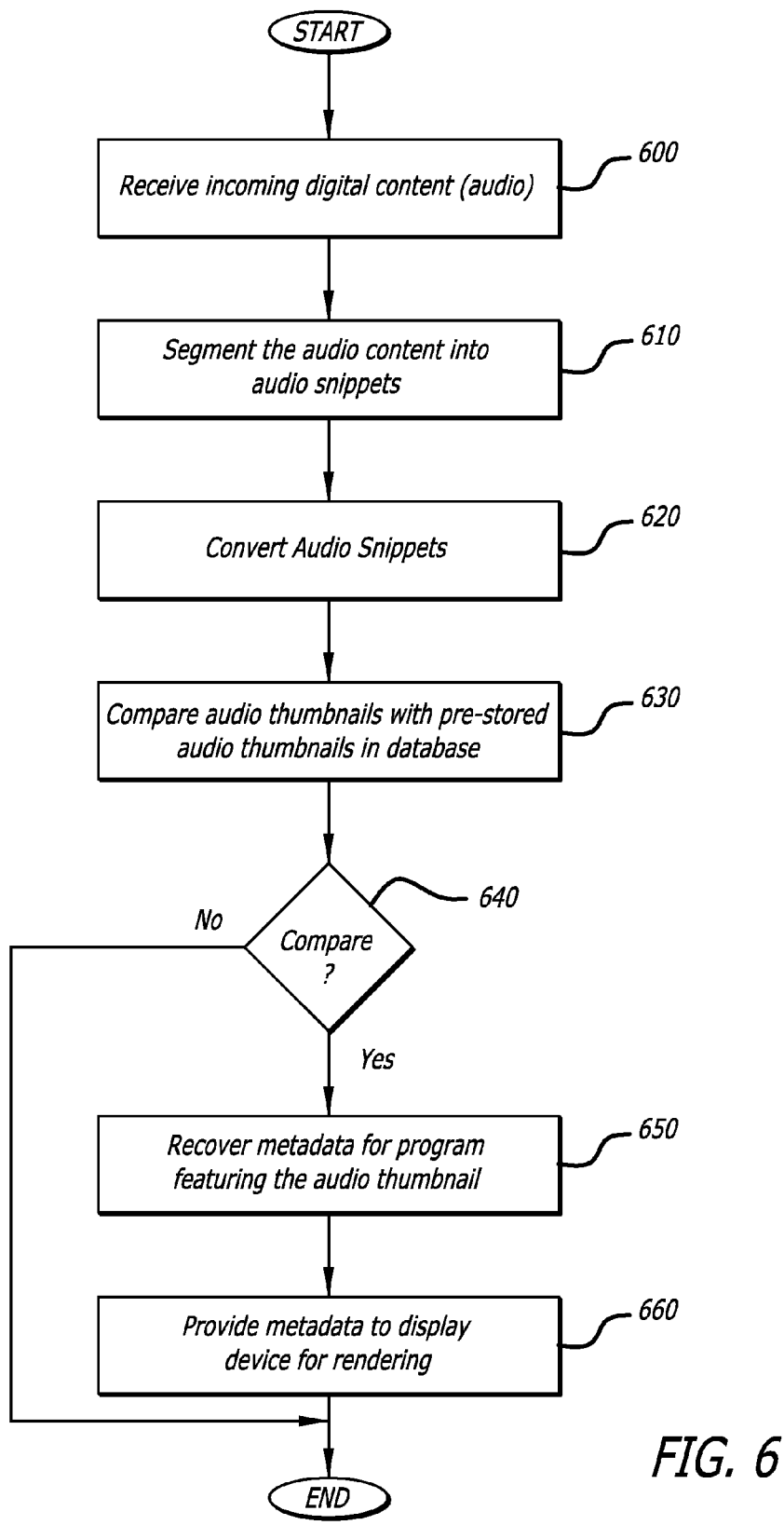
FIG. 6 is an illustrative embodiment of the operations for providing metadata for incoming digital content to a display device in accordance with one embodiment of the invention.

Referring now to FIG. 6, an illustrative embodiment of the operations for providing metadata for incoming digital content to a display device is shown, where the metadata is provided after identifying the incoming digital content and its playback location. Herein, upon receiving incoming digital content (block 600), the digital content is decompressed and decrypted as needed, and the decompressed digitized audio forming the digital content is divided up into audio snippets (block 610). According to this embodiment of the invention, the audio snippets are processed into audio thumbnails that constitute representations of the audio snippet (block 620). Normally, the audio thumbnails are smaller in size than the audio snippets.

The audio thumbnail(s) are compared with the pre stored audio thumbnails to determine if the identify and/or location of the audio thumbnails can be determined (block 630). In the event of the audio thumbnail(s) compares with one of the pre-stored audio thumbnails, the metadata associated with the digital content is recovered and provided to the display device for rendering (blocks 640, 650 and 660). Otherwise, no match is detected, and thus, metadata cannot be recovered. This may result in a default setting with predetermined selectable images or the display of no images with the video output.

In the foregoing description, the invention is described with reference to specific exemplary embodiments thereof. It will, however, be evident that various modifications and changes may be made thereto without departing from the broader spirit and scope of the present invention as set forth in the appended claims.

As an example, while the audio associated with digital content 115 has been represented as uncompressed, digital data, in the alternative, it is contemplated that this audio may be (i) compressed as part of a transport stream, program stream, packetized elementary stream, or the like, (ii) uncompressed from an HDMI™ stream or TOSLINK™ stream, or (iii) provided in analog form for subsequent A/D conversion.

Moreover, while audio thumbnail comparisons have been described for identifying the viewing location and metadata associated with incoming content, it is contemplated that other techniques may be used. For instance, one technique is a sliding window sample bit comparison against items within a stored database. Another technique involves audio dialogue-to-text conversion employing technologies such as voice recognition with conversion to text for comparison with script text or closed captioning text for comparison with database script text. Another technique involves music recognition comparison to database music.

The specification and drawings are accordingly to be regarded in an illustrative rather than in a restrictive sense.

What is claimed is:
1. A system comprising:
at least one video display adapted to receive, from a source of digital content, digital content and to display the digital content, the digital content comprising at least one audio-video (A/V) program including video, the digital content comprising at least one A/V program not including metadata comprising information associated with video in the A/V program;
at least one computer memory that is not a transitory signal and that comprises instructions executable by at least one processor;

at least one processor adapted to access the instructions to:
produce from the A/V program including video at least one audio thumbnail, the at least one audio thumbnail being a representation of audio from digital content;
route the at least one audio thumbnail to a first database different from the source of digital content for comparison of the at least one audio thumbnail to pre-stored audio thumbnails in the first database to determine whether at least one match is found between the at least one audio thumbnail and one of the pre-stored audio thumbnails;
receive metadata associated with the A/V program from a metadata base different from the first database, responsive to at least one match being found between the at least one audio thumbnail and a first pre-stored audio thumbnail in the first database, the metadata being retrieved by an identifier, received by the metadata base from the first database, corresponding to the first pre-stored audio thumbnail;
the video display being adapted to display the metadata with the A/V program, wherein the metadata comprises information identifying a particular location for the scene of the content so that the metadata, when processed, provides information concerning the particular location such that a playback position of the video associated with the audio thumbnail is ascertained by identifying a location of the audio thumbnail within the content, the system further comprising:
a transceiver that is adapted to retrieve the metadata.

2. The system of claim 1, wherein the system includes a transceiver that is adapted to retrieve metadata that, when processed, produces the metadata as background images along an outer border of a display area while the A/V program is displayed as foreground images.

3. The system of claim 1, wherein the system includes a transceiver that is adapted to retrieve metadata that, when processed, produces the one or more displayable images that enable the viewer to purchase the digital content stored in a machine readable medium.

4. The system of claim 1 further comprising:
audio extraction logic that is adapted to separate digital audio from the digital content into one or more audio snippets and to output the one or more audio snippets to the audio conversion logic.

5. The system of claim 4, wherein the audio extraction logic further performs pre-processing operations on the digital audio to normalize the digital audio before generating the one or more audio snippets.

6. The system of claim 1, comprising a transceiver adapted to retrieve the metadata that, when processed, produces one or more displayable images, wherein at least one of the displayable images is a uniform resource locator.

7. The system of claim 1, wherein the video display is adapted to use the metadata to display additional information pertaining to the A/V program and/or links (URLs) to the additional information.

8. The system of claim 1, wherein the at least one computerized management assembly is adapted to:
conduct an initial search of the first database for audio from first programs based on the first televised programs being scheduled to be aired at a predetermined time, the initial search not including audio in the first database from second programs.

9. A method comprising:
receiving, from a source of digital content, digital content and to display the digital content, the digital content comprising at least one audio-video (A/V) program including video but not including metadata comprising information associated with video in the A/V program;
producing from the A/V program including video at least one audio thumbnail, the at least one audio thumbnail being a representation of audio from digital content;
routing the at least one audio thumbnail to a first database different from the source of digital content for comparison of the at least one audio thumbnail to pre-stored audio thumbnails in the first database to determine whether at least one match is found between the at least one audio thumbnail and one of the pre-stored audio thumbnails;
responsive to at least one match being found between the at least one audio thumbnail and a first pre-stored audio thumbnail in the first database, receiving, from a metadata base different from the first database, metadata associated with the A/V program;
the metadata being retrieved from the metadata base using an identifier received from the first database corresponding to the first pre-stored audio thumbnail; and
displaying the metadata with the A/V program, wherein the metadata comprises information pertaining to context within a scene of content including video associated with audio thumbnails, the information comprising information identifying a location for the scene of the content so that the metadata, when processed, provides information concerning the location such that a playback position of the video associated with the at least one audio thumbnail is ascertained by identifying a location of the audio thumbnail within the content.

10. The method of claim 9, wherein segmenting of digital audio is performed on a time-basis through video frame synchronization.

11. The method of claim 9, wherein segmenting of digital audio is performed using local maxima and/or minima of the digital audio as reference points.

12. The method of claim 9, wherein converting audio snippets into a plurality of audio thumbnails is conducted by performing a Fast Fourier Transform on each of the plurality of audio snippets, each of the plurality of audio thumbnails being a representation of a corresponding audio snippet and having a bit size lesser than the corresponding audio snippet.

13. The method of claim 9, wherein displaying of at least a portion of metadata on the display device during playback of digital content includes producing a displayable image using the metadata that is displayed with the digital content that enables a viewer to purchase the digital content stored in a machine readable medium.

* * * * *